United States Patent Office 2,806,447
Patented Sept. 17, 1957

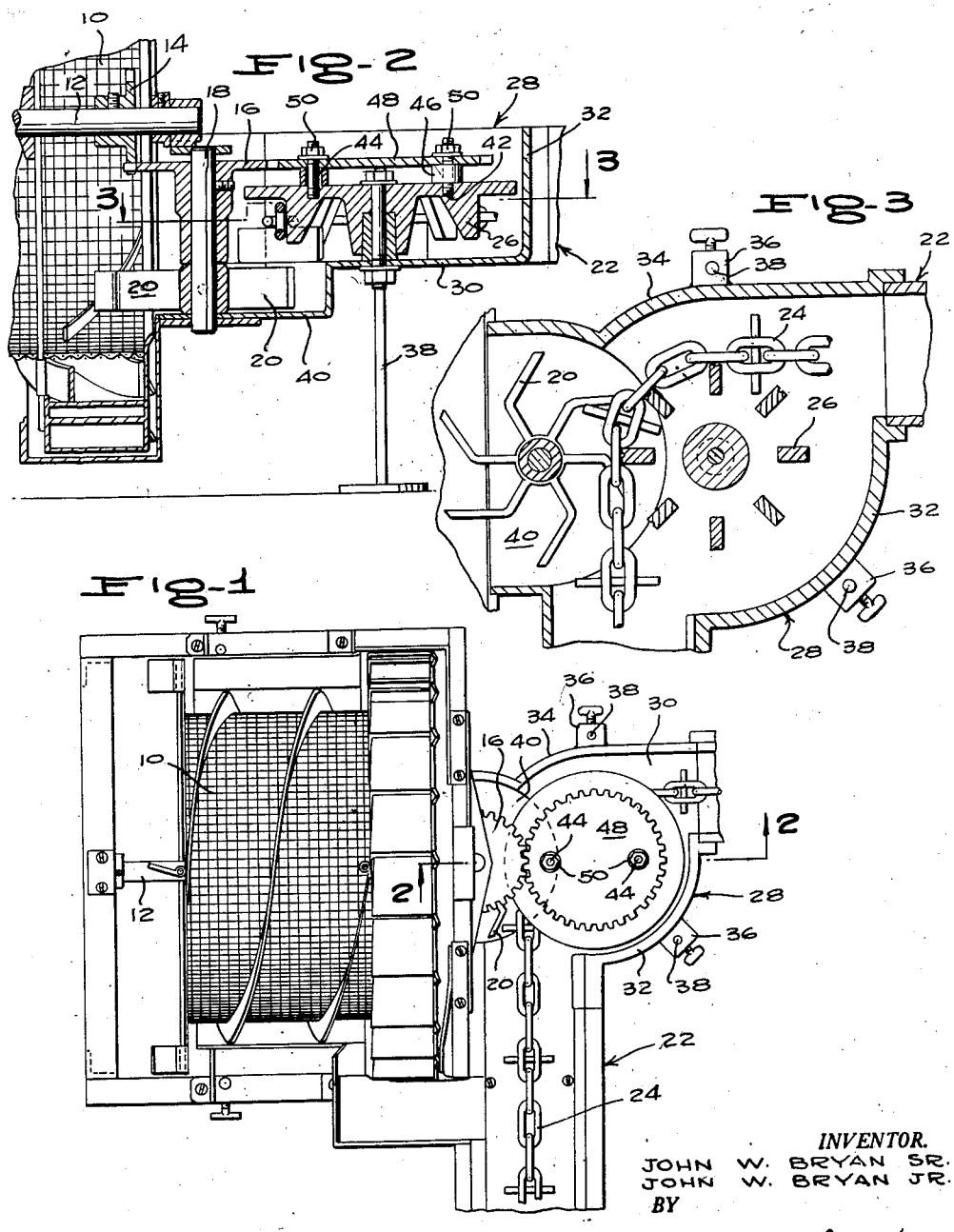

2,806,447
DRIVE FOR A FEED AND BEDDING SEPARATOR

John W. Bryan, Sr., and John W. Bryan, Jr., Traphill, N. C.

Application December 20, 1955, Serial No. 554,253

2 Claims. (Cl. 119—52)

This invention relates to a poultry feed and poultry bedding material separator.

The primary object of the present invention is to facilitate the connection and disconnection of the separator from the driving means therefor so that the feeding device may operate without operating the separator, the driving means being composed of a minimum number of parts. Other important objects and advantageous features of the invention will be apparent from the following description and the accompanying drawings, wherein, for purposes of illustration only, a specific form of the invention is set forth in detail.

In the drawings:

Figure 1 is a fragmentary top plan view of said form of the invention;

Figure 2 is an enlarged fragmentary vertical longitudinal sectional view taken substantially on the line 2—2 of Figure 1; and Figure 3 is a fragmentary horizontal sectional view taken substantially on the line 3—3 of Figure 2.

Referring to the drawings in detail, the illustrated separator comprises a rotating separating drum 10 which is fixed on a horizontally extending shaft 12 within a housing 13. The shaft 12 carries adjacent one end thereof a pinion 14 which is in meshing engagement with a gear wheel 16 which is fixed on the upper end of a vertical shaft 18. The vertical shaft 18 has on its lower end radially outwardly extending wiper arms 20 defining sweeps by which a mixture of feed and bedding material is delivered into the drum 10 as the drum 10 is rotated.

The separator described briefly above is mounted adjacent one end of a feed chute designated generally 22 along which a mixture of feed and bedding material is moved by a scraper chain 24. In the corners of the feed trough 22 there are provided guide pulleys 26 around which a chain 24 moves. In the present instance, one of the guide pulleys 26 in a corner of the trough 22 is enclosed in a housing designated generally 28 which comprises a bottom wall 30 of substantially circular formation having opposed peripheral upwardly extending walls 32 and 34 having laterally extending supporting apertured lugs 36 receiving the upper ends of supporting rods 38 defining legs upon which the housing 28 is supported.

Formed in the bottom wall 30 of the housing and depending therefrom is a well 40 which extends laterally from the housing and opens into the interior of the drum 10. As illustrated in Figure 3, the well 40 is concentric with the axis of the vertical shaft 18 and defines a chamber within which the arms or sweeps 20 move to direct mixed feed and bedding material from the well 40 into the cylinder 10.

As shown in Figure 2, the top of the pulley 26 is provided with circumferentially spaced internally screw threaded sockets 42 into which the lower ends of studs 44 are threaded. Spacers 46 surround the studs 44 and space upwardly from the pulley 26 a gear wheel 48 which meshes with the gear wheel 16. It will thus be seen that as the chain 24 moves along the chute 22, the guide pulley 26 and the gear wheel 48 are rotated to impart rotary motion to the drum 10. Nuts 50 are threadably engaged on the upper ends of the studs 44 to removably hold the gear wheel 48 on the spacers on the guide pulley 26.

Obviously, when it is desired to operate the scraper chain 24 witout driving the separator drum 10, the nuts 50 may be removed from the studs 44 and the gear wheel 48 removed so as to disengage the teeth thereof from the teeth of the gear wheel 16.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. A separator for separating poultry feed from bedding material comprising a rotary horizontal drum having an open end, a vertical shaft supported at said end of the drum and operatively connected to the drum, a horizontal chute having a corner adjacent to the open end of the drum and located at the side of said vertical shaft remote from the open end of the drum, said chute corner having a bottom wall and opposed side walls, a lateral extension on said bottom wall depressed below the level of the bottom wall and defining a well positioned beneath said vertical shaft, radial sweep arms on said vertical shaft within said well serving to sweep material from said well into the open end of the drum, said vertical shaft having a first gear wheel fixed thereon above the chute bottom wall, a rotary chain guide pulley mounted in the chute corner above said bottom wall, a second gear wheel superimposed upon and removably secured to the guide pulley, and meshed with said first gear wheel.

2. A separator for separating poultry feed from bedding material comprising a rotary horizontal drum having an open end, a vertical shaft supported at said end of the drum and operatively connected to the drum, a horizontal chute having a corner adjacent to the open end of the drum and located at the side of said vertical shaft remote from the open end of the drum, said chute corner having a bottom wall and opposed side walls, a lateral extension on said bottom wall depressed below the level of the bottom wall and defining a well positioned beneath said vertical shaft, radial sweep arms on said vertical shaft within said well serving to sweep material from said well into the open end of the drum, said vertical shaft having a first gear wheel fixed thereon above the chute bottom wall, a rotary chain guide pulley mounted in the chute corner above said bottom wall, a second gear wheel superimposed upon and removably secured to the guide pulley, and meshed with said first gear wheel, said chute having a bottom wall, and a scraper chain sliding along the chute bottom wall and trained around said guide pulley for conveying material in the chute along the chute and into said corner and said well.

References Cited in the file of this patent

UNITED STATES PATENTS

| | | |
|---|---|---|
| 1,386,298 | Winslow | Aug. 2, 1921 |
| 2,338,348 | Newman | Jan. 4, 1944 |
| 2,565,779 | Muddiman | Aug. 28, 1951 |
| 2,709,520 | Stark | May 31, 1955 |